United States Patent [19]

van Holten

[11] 4,362,469

[45] Dec. 7, 1982

[54] DEVICE FOR DERIVING ENERGY FROM A FLOW OF FLUID

[75] Inventor: Theodoor van Holten, Pijnacker, Netherlands

[73] Assignee: Stichting Energieonderzoek Centrum Nederland, The Hague, Netherlands

[21] Appl. No.: 181,391

[22] Filed: Aug. 25, 1980

[30] Foreign Application Priority Data

Sep. 4, 1979 [NL] Netherlands ................. 7906627

[51] Int. Cl.³ ............................................. F03D 1/06
[52] U.S. Cl. .................................. 416/191; 416/236 A
[58] Field of Search ................ 416/191, 189 A, 236 A

[56] References Cited

U.S. PATENT DOCUMENTS

| 104,918 | 6/1870 | St. Clair | 416/189 A |
|---|---|---|---|
| 988,735 | 4/1911 | Perry | 416/189 A |
| 1,147,658 | 7/1915 | Stukes | 416/192 X |
| 1,467,227 | 9/1923 | Capell | 416/192 X |
| 2,361,676 | 10/1944 | Baker | 416/236 A |
| 3,038,543 | 6/1962 | Davidson | 416/236 A |
| 4,093,402 | 6/1978 | van Holten | 416/191 X |
| 4,147,472 | 4/1979 | Kling | 416/189 A X |
| 4,159,191 | 6/1979 | Graybill | 416/189 A X |

FOREIGN PATENT DOCUMENTS

| 128790 | 7/1950 | Sweden | 416/191 |
|---|---|---|---|
| 213022 | 3/1924 | United Kingdom | 416/189 A |
| 695519 | 8/1953 | United Kingdom | 416/189 A |

*Primary Examiner*—Everette A. Powell, Jr.
*Attorney, Agent, or Firm*—Cushman, Darby & Cushman

[57] ABSTRACT

Improved process and device for extracting energy present in a flowing fluid medium wherein a supported hub with propellers or blades is placed in said medium and the blades are provided with a wing or vane at the tip. The wing is of such a form that it generates a "venturi effect" in the flowing medium by which a part of the fluid which should normally pass outside the propeller disc area, is drawn into the propeller. The improvement consists of mixing of fluid which normally should pass outside the venturi with fluid which has flowed through the blades by provisions on blades and/or wing or vanes.

3 Claims, 7 Drawing Figures

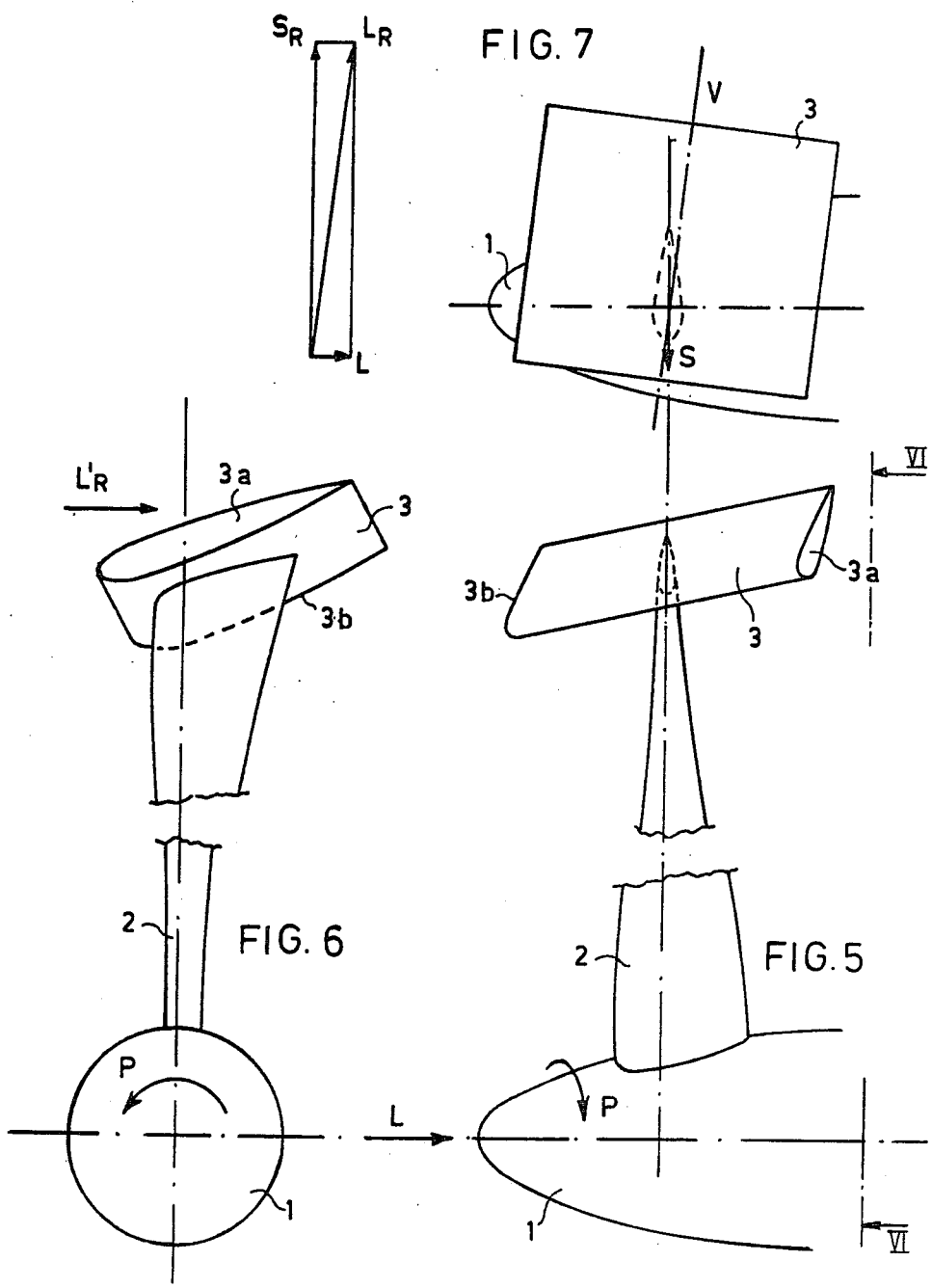

DEVICE FOR DERIVING ENERGY FROM A FLOW OF FLUID

The invention relates to a method for deriving energy from a flow of fluid, by positioning a hub therein, which is rotatable around a shaft and upon which mainly radially extending propeller blades or wings are attached in a twisted way, such that substantially along the entire length of the blade or wing by the relative flow direction occurring during action a driving force is exerted and the tips of the wings are equipped with a vane as well, which generates a lifting force being substantially directed radially in the direction of the hub and which causes an annular whirl in the flow of fluid during rotation. The invention also relates to a device for deriving energy from a flow of fluid, such as a wind mill, which might be driven by a flow of air, for obtaining and transforming energy from said flow of fluid, said device comprising a hub which is rotatable around a shaft and upon which mainly radially extending propeller blades or wings are attached in a twisted way, such that substantially along the entire length of the blade or wing by the relative flow direction occurring during action a driving force is exerted, while the wings at the tips are equipped with a vane, which generates a lifting force being substantially directed radially in the direction of the hub and which causes an annular whirl during rotation.

A similar device for deriving energy from a flow of fluid is described among others in the Belgian Patent Specification No. 865377 and in the corresponding Netherlands Patent Application No. 7803381, German Patent Application No. 2715729, Swedish Patent Application No. 7803823, Brasilian Patent Application No. 7802137, French Patent Specification No. 2386701 and U.S. Pat. No. 4,147,472. It is known that air which normally should pass by flowing along an air propeller will by the annular whirl flow now be drawn into same, such that kinetic energy from a larger cross sectional area will be utilized.

Now it has been found as a result of experiments, that without any (substantial) increase of the diameter of wings kinetic energy present in air which formerly passed about the annular whirl formed by the vane at the wings tips, sort of outer flow, can now be utilized too.

For this purpose a natural mixing effect of outer flow and suction, the existence of which had not been surmised formerly, will be increased by provisions at vane and wings, increasing the natural mixing of outer flow and suction.

It appeared in fact, that but the already known suction effect resulting from the annular whirl, an increase in efficiency is generated by mixing outer flow and the suction occurring in a natural manner already. Mixing of outer flow and suction results in a larger amount of air being entrained across the blades during shorter periods of time, in consequence of said mixing of outer flow and suction only. After having got the insight that the efficiency of an air turbine with auxiliary vane will be augmented too as a consequence of this hitherto unknown ejector phenomenon, it proved to be possible to obtain an unexpectedly big additional augmentation of yield efficiency. The effect of mixing suction and outer flow could be increased for example by providing an annular vane surrounding the wings tips with local differences in profile and/or differences of the angle of adjustment. By such differences of profile and/or differences of the angle of adjustment a fluctuating radial mixing will be obtained.

It might be expected that the differences of angles of adjustment and the differences of profiles would exert very undesirable forces upon the hub, resulting from the locally deviating lifting powers. However it appeared that in practice said forces could be met by means of an expedient bearing. The application of a rotating annular vane attached at the tips of the blades of a wind mill as a means to obtain an annular whirl flow has been disclosed in the Belgian Patent Specification No. 865377 cited above and in the corresponding patent specifications. However it is possible to obtain the annular whirl flow in another manner.

The mixing effect can also be increased by providing one or several of a number of wings having an annular vane at the tips with one or several separate auxiliary vanes situated more inwardly, the span of which generating a subsynchronous state of flow during rotation.

Still another method is the positioning of the device mentioned above at an angle ranging from 15° to 45° with regard to the horizontal line, while the blades are provided with a rotatory annular wing attached at the tips. The optimal value in this respect amounts to about 30°.

The improvements in yield efficiency mentioned above obtained by the increase of a natural mixing phenomenon of outer flow and suction have been determined more particularly in experiments with an air turbine, the wings of which had been provided with auxiliary vanes and which has been disclosed in the Netherlands Patent Application No. 7407721 and in the corresponding U.S. Pat. No. 4,093,402.

The device described in the Netherlands Patent Application No. 7407721 and in the U.S. Pat. No. 4,093,402 comprises a hub which is rotatable around a shaft and upon which mainly radially extending blades are attached in a twisted way such that substantially along the entire length of the blade or wing by the relative flow direction occurring during action a driving force is exerted, whereas each of the propeller blades or wings is provided with one or several auxiliary vanes, one of which is located at the wings tip, and the auxiliary vanes, as seen in a sectional plane defined by the relative flow direction and the centerline of the propeller blade or wing, are directed such that the forward elongation of the chord of the vanes profile situated in said plane will intersect a line positioned in said plane and running parallel to said relative flow direction and through the rotational axis of the hub. As already mentioned the auxiliary vanes and the earlier described annular vane cause a spinning annular whirl at the wings tips during rotation, which by some kind of "Venturi"-effect will suck air into it, which would normally pass along the disc of rotation of the propeller blade. The amount of air per unit of frontal area flowing into the propeller as a result of this "Venturi"-effect is augmented. The "Venturi"-effect can be made visible by carrying out comparative model runs with use of fume, comparing air propellers with and without auxiliary vanes at the tips of the wings.

Relating to the increase of efficiency as earlier mentioned it has been described in the Netherlands Patent Application No. 7407721 that the amount of air which delivers energy into the referred direction can be increased at least twice. From further experiments it appeared however that the improvement of yield efficiency resulting from the "Venturi"-effect has a higher value and will be in principle fivefold.

Furthermore it appeared from proceeding experiments that an additional multiplication factor for the energy is obtained which as a result of the "Venturi"-effect multiplies said factor 5 with about 13 such that a value of 6–7 appears. The value of this new factor 13 has been confirmed by quantitative measurements. According to these quantitative measurements the energy yield multiplication factor is caused by a mixing phenomenon.

This mixing phenomenon might be illustrated as follows: In the fluid around an air propeller or another device, with the tips of the wings provided with auxiliary vanes, a "Venturi" type conduit duct originates. This "Venturi" conduit, which originates around the air propeller at a sufficient number of revolutions of same, can be made visible by means of e.g. fumes. The "neck" of this "Venturi" conduit is formed by a stationary spinning annular whirl which originates in the area of the rotor at the location of the auxiliary vanes. The air not flowing across said air propeller now appears to flow around said "Venturi" conduit and to mix with air having passed across said air propeller and having been dragged consequently. The air flown across the air propeller is denoted as suction and the air flowing around the "Venturi" conduit is denoted as outer flow. Since the dragged suction is being mixed with the undragged outer flow an entraining or pumping effect is generated whereby the air propeller will obtain an unexpectedly high yield efficiency per unit of frontal area. This increased efficiency cannot be explained from the reflection about the effect of an air propeller provided with blades having auxiliary vanes at the tips, which has led to the construction of the device disclosed in the above mentioned Netherlands Patent Application No. 7407721. The augmented yield efficiency can neither be derived from the expectations which a person skilled in the art would have in relation to the wind turbine disclosed in the Belgian Patent Specification No. 865377.

Utilizing this novel insight it is possible in a surprising way to considerably augment the yield efficiency of a device driven by a fluid such as e.g. air, by increasing the mixing of suction and outer flow already present in the "natural" way. According to the novel insight the already present "natural" mix or ejector flow which renders a multiplication factor of 13 will be augmented up to a factor of 2–3 by provisions at the auxiliary vanes or at the wings which increase mixing action. Preferably the mixing or ejector effect so desired will be obtained by generating a fluctuating radial velocity of the air flowing across the propeller. This fluctuating radial velocity can be obtained in the optimal way if one or several of the individual auxiliary vanes at the tips of the wings will have a stronger lifting force than any auxiliary vane at other wings. A stronger lifting force can be caused by means of a different adjustment angle or by different shaping of the profile of the auxiliary vane.

It is observed that a difference in lifting force gives rise to the disadvantage of an unequal axial load. However it appears that this axial load can be met by an expedient bearing. The mixing effect might also be obtained, if desired in combination with the earlier mentioned effect, by providing one or several wings having individual auxiliary vanes at the tips with several auxiliary vanes which are to be located more inwardly and which have a span causing a subsynchronous state of flow. A subsynchronous state of flow means that the auxiliary vanes which are located more inwardly shall not in any way cause a stationary annular whirl flow. Only the auxiliary vanes at the tips of the wings are allowed to generate a stationary annular whirl flow. Therefore the span of the inwardly located auxiliary vanes shall be shorter than that at the tips of the wings.

A very simple way to obtain the mixing effect is the positioning of the axis of rotation at an angle with reference to the horizontal line.

Preferably the angle to the horizontal will range from 15° to 45°. The optimal value is about 30°.

It is observed that at least based upon present knowledge a wind turbine rotor having wings with auxiliary vanes will be a more favourable embodiment than a wind turbine rotor with an annular wing surrounding the blades either completely or for the most part. A preferred embodiment provided with tilted auxiliary vanes has two advantages. Primarily the amount of materials for the rotatory part is considerably smaller. Generally two wing blades only and not a multitude of same will be used, and moreover the amount of material for two tilted auxiliary vanes is smaller than that for an annular wing. Another advantage is that the annular whirl flow generated by the tilted auxiliary vanes is more intense. The whirl flow is more intense because the volume capacity of the annular wing is in a sort of way for the largest part taken by the fluid which is able to whirl while this very volume in an annular wing, as opposed to wings with auxiliary vanes at the tips, is taken by the volume of that annular wing itself.

Both these advantages viz. use of less materials and a more intense annular whirl will also be obtained if an auxiliary vane which is positioned substantially perpendicularly to the direction of rotation or either an auxiliary vane positioned downstream in sort of deflected shape will be used. In all these cases auxiliary vanes are used which are directed somewhat towards the center of rotation, the foremost or leading edge of the vane being directed in a tilted way in the general direction of the rotation.

The invention is illustrated with reference to the accompanying drawings which however do not intend to be restrictive in any way.

FIGS. 5, 6 and 7 altogether including the velocity diagram belonging to FIG. 7 represent a further elucidation of part of the flow phenomena which are of importance with wind turbines having wings provided with auxiliary vanes.

Figure 1:
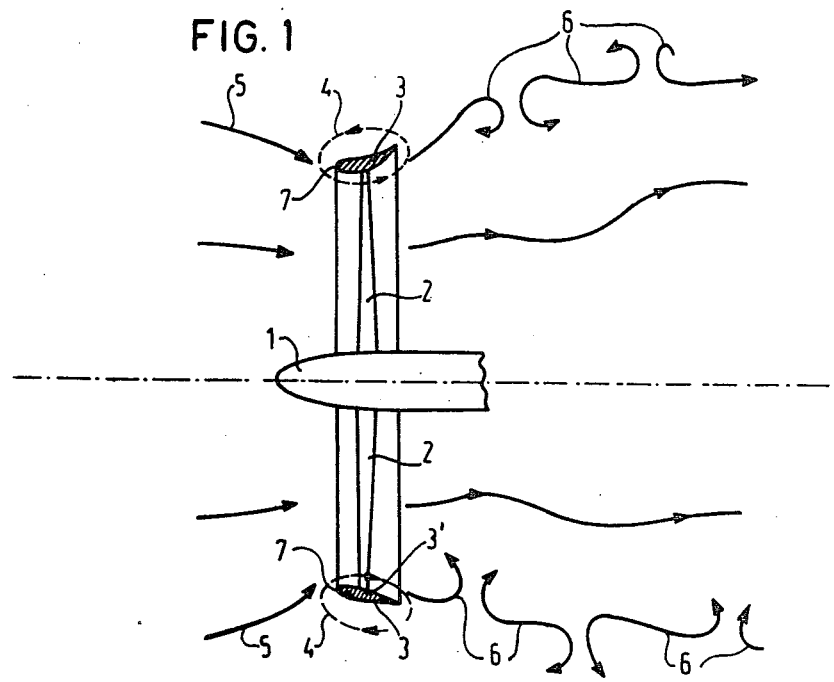
FIG. 1 shows a schematic view of a wind turbine rotor provided with an annular wing having different profiles at different cross-sectional areas.

In FIG. 1 a hub 1 is represented with blades 2 attached in a twisted way; generally there are more than 2 blades. The blades 2 are surrounded by an annular wing 3, said annular wing showing a more bulging profile in the direction towards the hub 1. As a result of said more bulging profile the wing exerts a lift force directed towards the hub 1. The annular wing 3 causes an annular whirl flow 4 in consequence of the lift force directed towards the hub 1, such that air is sucked according to a kind of "Venturi" conduit 5 indicated by arrows. At the point 3' the cross section of the annular wing is different such that the lift force with oncoming flow is smaller at this point. The different lift force leads to a fluctuating radial mixing of air which flows around the "Venturi" pattern indicated by 5, and suction occurs. This mixing is indicated schematically by arrows 6. It is observed that the obtuse leading edge 7 of the annular wing 3 is at the front side or suction side of the wind turbine.

The annular whirl flow is in this case substantially caused by air flowing into the wings in axial direction.

Figure 2:
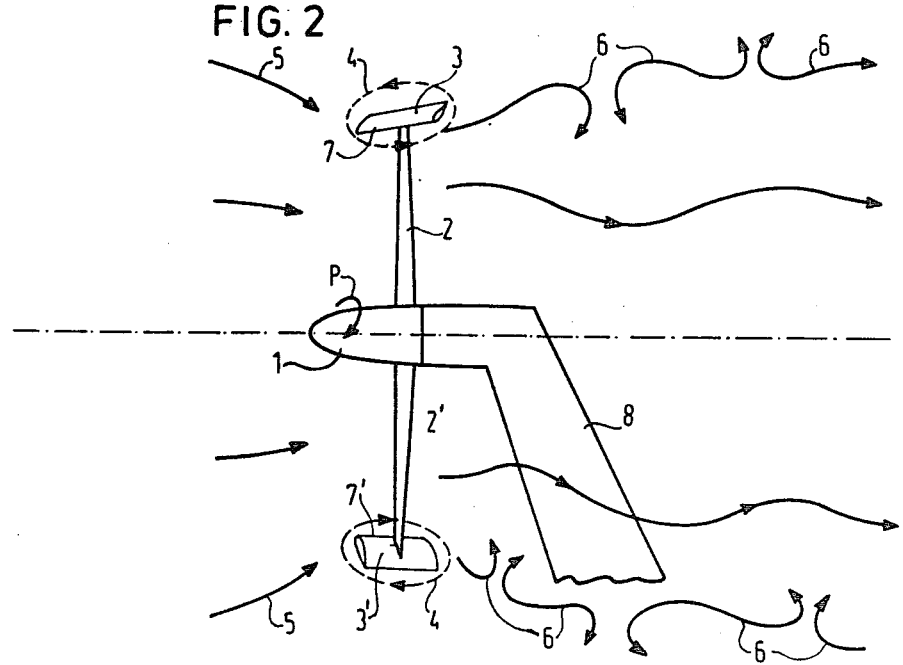
FIG. 2 shows a schematic view of a wind turbine provided with auxiliary vanes at both the tips of the wing blades, one of said auxiliary vanes exerting a different lift force on the hub.

In the case of the installation as shown in FIG. 2 with auxiliary vanes at the tips of the wings however the circulating annular whirl is caused by air which flows substantially tangentially along these vanes which have profiles similar to airplane wings. The difference in relative velocity of inflow at the auxiliary vane and at the annular wing is further illustrated in FIGS. 5, 6 and 7 and in the velocity diagram belonging to FIG. 7.

In FIG. 2 a hub 1 is represented, upon which two blades 2 and 2' are attached in a twisted way such that, in case air is oncoming from the left side, the hub 1 will start to rotate in the direction indicated by arrow P. The hub 1 is positioned upon a support 8. At the tips of the wings 2 and 2' two auxiliary vanes 3 and 3' respectively having profiles similar to airplane wings are attached, said profiles being more bulging in the direction towards hub 1. In the case of FIG. 1 the profile of vane 3' is more bulging than the profile of vane 3. The leading edges 7 and 7' of the auxiliary vanes 3 and 3' respectively are positioned in the direction of the rotation P.

Figure 3:
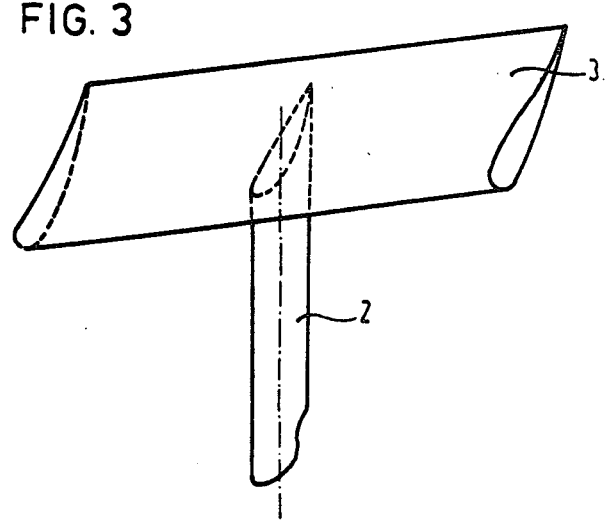
FIGS. 3 and 4 are larger plan views of both the tips of the wing blades with accessory auxiliary vanes to match as shown in FIG. 2.
Figure 4:
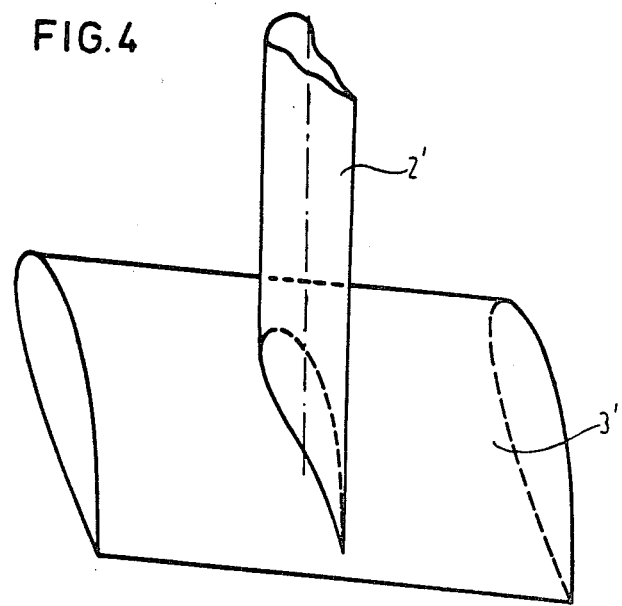
Figure 8:
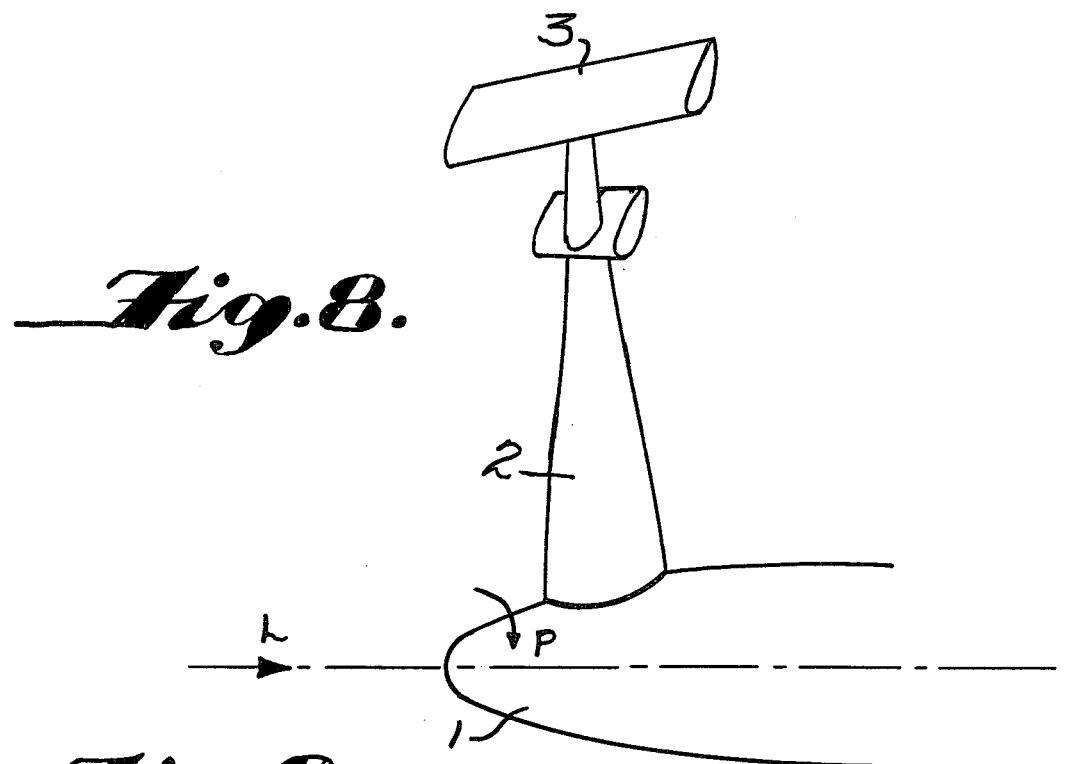
Figure 9:
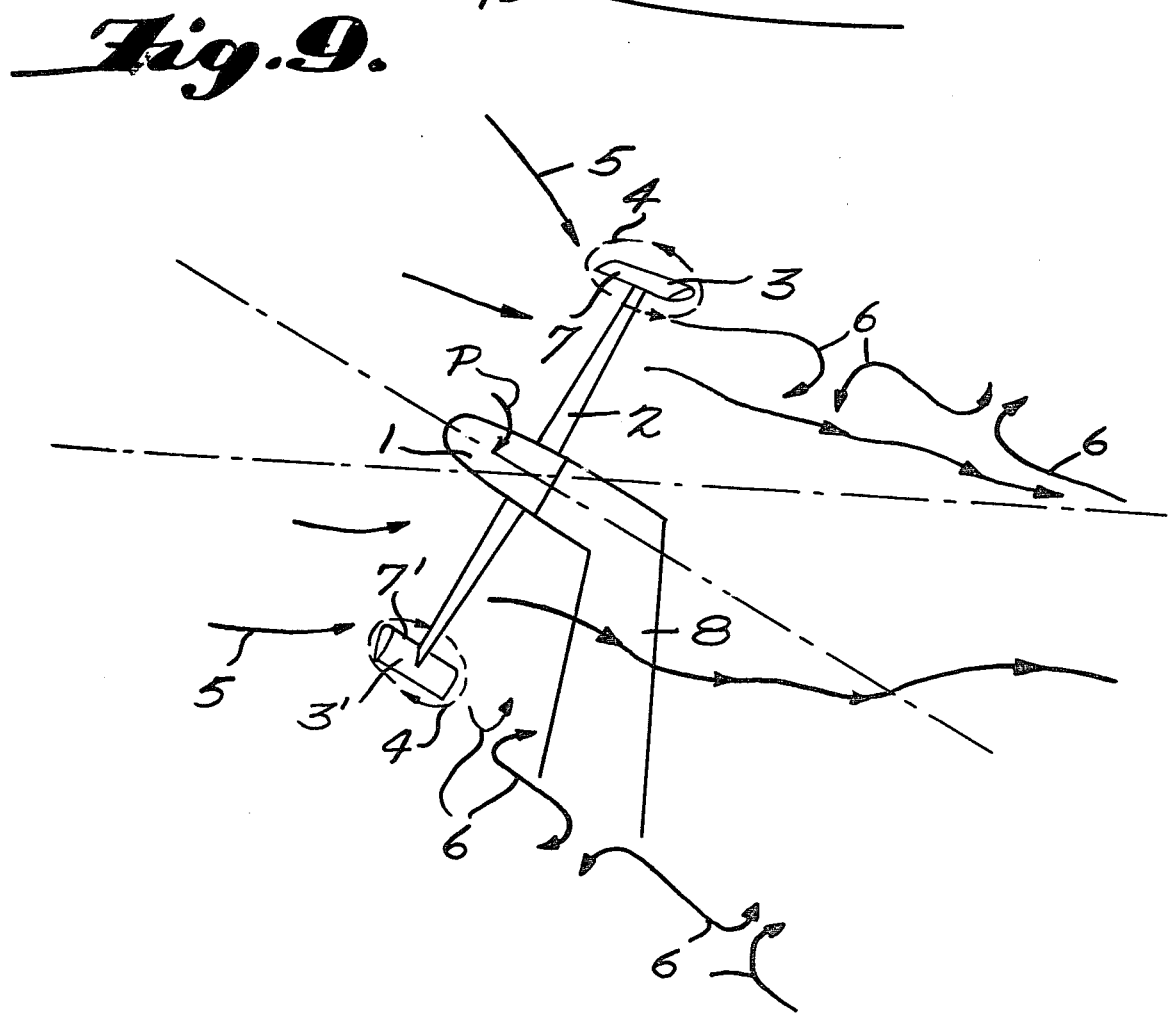

The configurations of the auxiliary vanes 3 and 3' originate a spinning annular whirl as indicated at 4. Said annular whirl 4 has the result that air flowing in from the left side is sucked in a "Venturi" conduit pattern indicated with 5. Since the profile of the auxiliary vane 3' is more bulging than that of 3 a mixing of outer flow and of suction is originated, as indicated with arrows 6. In this case the suction consists of air flown from the left to the right through the "Venturi" conduit pattern 5. In the FIGS. 3 and 4 the tips of the wings 2 and 2' with accessory auxiliary vanes 3 and 3' are represented on a larger scale. The flow in FIG. 2 is further illustrated in FIGS. 5, 6 and 7 and the velocity diagram belonging to FIG. 7.

Relating to the discussion of the FIGS. 5,6 and 7 now to follow it is observed that the action of the auxiliary vane is still improved if, according to the preferred embodiment, the auxiliary vane is tilted around the chord situated in the cross-sectional plane defined by the relative flow direction and the centerline of the propeller blade, such that the downstream end of the auxiliary vane is at a larger distance from the axis of rotation of the device than the upstream end. Hereby the induced resistance of the auxiliary vane will be restricted in particular and the auxiliary vane can absorb energy from the air which flows along, because the vane renders an axial component of force.

FIG. 5 shows a schematic side view of the uppermost wing 2 with an auxiliary vane; herein one wing only is shown.

FIG. 6 shows a back view according to the line II—II of FIG. 5.

FIG. 7 shows an upper view of the system of hub, wing and auxiliary vane of FIG. 5, together with a velocity diagram. A hub 1 is represented upon which two wings 2 and 2' are to be positioned of which only one wing 2 is shown in the drawing. Incase a stream of air with a velocity L is flowing into the device from the left side as represented in FIG. 5 the hub will start to rotate in the direction of the arrow P. If the device is rotating the tip of the wing 2 has a velocity which is represented as S in FIG. 6.

In the FIGS. 5-7 an auxiliary vane 3 is attached upon the tip of the wing 2, said auxiliary vane being rectangular in this case. It is observed that other shapes such as for example tapered shapes of auxiliary vane are applicable as well. As a result of the rotation of the wing the auxiliary vane 3 has a circumferential velocity too which is about equal to S. In the diagram of FIG. 7 the relative air velocity resulting from said rotation has been indicated by $S_R$ so that with reference to the auxiliary vane 3 a relative air velocity $L_R$ is generated. Because $S_R$ is several times larger than L the direction of $L_R$ will only be subject to slight variations also in case of a change of proportion. The auxiliary vane 3 the leading edge of which is about perpendicular to the direction of $L_R$ will always receive substantially a flow in the same manner. From FIG. 6 it appears in particular that the auxiliary vane 3 has an angle of attack with reference to the relative air velocity such that a force will be exerted on the auxiliary vane, the main component of which is directed in the line of the axis of the hub 1. Truly FIG. 6 shows a back view of FIG. 1, however this back view shows a very slight angle only towards a plane view in the longitudinal direction of the vane, which means perpendicular to a plane V indicated in FIG. 7, said plane being parallel to the relative air velocity and running through the center line of wing 2. The component indicated as $L'_R$ in FIG. 6 of the relative air velocity thus forms only a very slight angle with the real relative air velocity.

As appears from FIGS. 5 and 6 the auxiliary vane 3 is in its longitudinal direction not perpendicular to plane V but it is tilted with reference to a chord running in this plane such that the downstream tip 3a is to be situated at a larger distance from the centerline of the hub 1 than the upstream tip 3b. This gives rise to the advantages mentioned already in the above.

I claim:

1. Apparatus for deriving energy from a flow of fluid, such as a windmill driven by a flow of air, said device comprising a hub which is rotatable around an axis and upon which substantially radially extending propeller wings are attached in a twisted way, such that substantially along the entire length of the wings the relative flow direction of the fluid, occurring during operation, will exert a driving rotating force on the hub, the wings being provided at their ends with auxiliary blades, which seen in a sectional plane defined by the relative flow direction of the fluid and the centerline of the wings are directed such that the forward elongation of the chord of the blades profile situated in said plane will intersect a line positioned in said plane and running parallel to the said flow direction and through the rotational axis of the hub, characterized by that the device has the axis of rotation of the hub at an angle of 15°–45° to the horizontal whereby said auxiliary blades are so formed and have such an angle of adjustment, that they generate during operation a lifting force substantially directed radially in the direction of the hub.

2. Apparatus for deriving energy from a flow of fluid, such as a windmill driven by a flow of air, said device comprising a hub which is rotatable around an axis and upon which substantially radially extending propeller wings are attached in a twisted way, such that substantially along the entire length of the wings the relative flow direction of the fluid, occurring during operation, will exert a driving rotating force on the hub, the wings being provided at their ends with auxiliary blades, which seen in a sectional plane defined by the relative flow direction of the fluid and the centerline of the wings are directed such that the forward elongation of the chord of the blades profile situated in said plane will intersect a line positioned in said plane and running parallel to the said flow direction and through the rotational axis of the hub, characterized by that the device has at least one of the auxiliary blades has a different angle of adjustment with respect to the other blades, whereby said auxiliary blades are so formed and have such an angle of adjustment, that they generate during operation a lifting force substantially directed radially in the direction of the hub.

3. Apparatus for deriving energy from a flow of fluid, such as a windmill driven by a flow of air, said device comprising a hub which is rotatable around an axis and upon which substantially radially extending propeller wings are attached in a twisted way, such that substantially along the entire length of the wings the relative flow direction of the fluid, occurring during operation, will exert a driving rotating force on the hub, the wings being provided at their ends with auxiliary blades, which seen in a sectional plane defined by the relative flow direction of the fluid and the centerline of the wings are directed such that the forward elongation of the chord of the blades profile situated in said plane will intersect a line positioned in said plane and running parallel to the said flow direction and through the rotational axis of the hub, characterized by that the device has at least one of the auxiliary blades has a different shape of profile with respect to the other blades whereby said auxiliary blades are so formed and have such an angle of adjustment, that they generate during operation a lifting force substantially directed radially in the direction of the hub.

* * * * *